Nov. 16, 1948.  J. L. MERRIAM  2,453,849
PIPE JOINT
Filed March 8, 1947
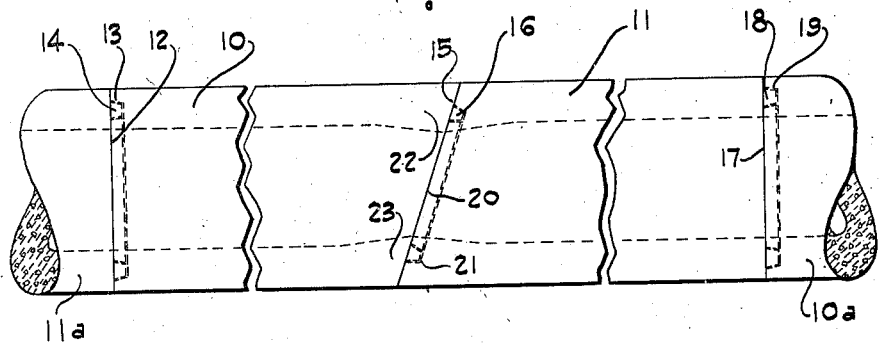
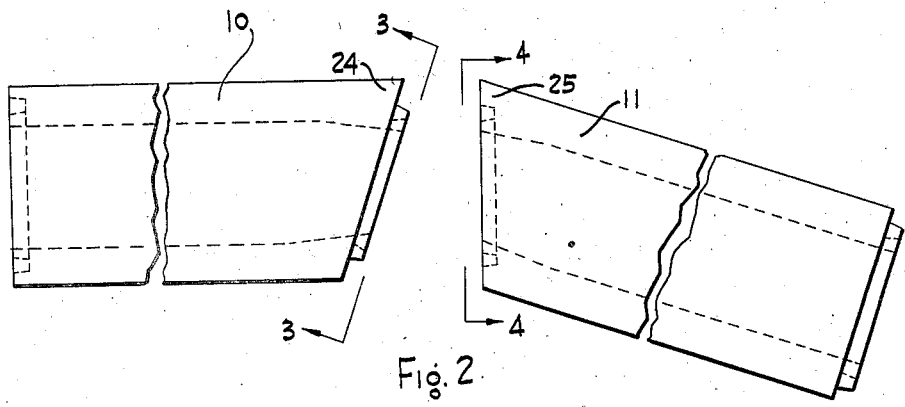
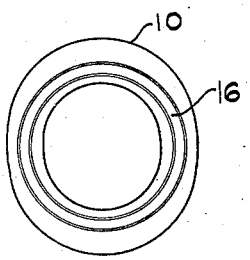 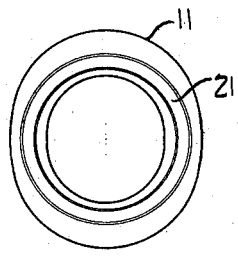
INVENTOR.
JOHN L. MERRIAM
BY Hazard and Miller
Attorneys Patented Nov. 16, 1948

2,453,849

UNITED STATES PATENT OFFICE 2,453,849

PIPE JOINT

John L. Merriam, Yucaipa, Calif.

Application March 8, 1947, Serial No. 733,291

3 Claims. (Cl. 285—112)

This invention relates to improvements in pipe joints and pipe sections. An object of the invention is to provide an improved pipe section which has its ends so formed that a plurality of sections may be assembled together in either of a plurality of different manners so that any desired pipe may be laid therewith. Thus, if straight pipe is desired the sections may be so assembled together as to form an indefinite length of straight pipe. On the other hand, if it is desired to have bends or turns in the pipe, the same sections, by being assembled together in a slightly different manner, may create a pipe with the desired bend or curvature.

Another object of the invention is to provide a pipe section having the above mentioned characteristics which is so designed that all sections are capable of being mutually assembled together.

Still another object of the invention is to provide a pipe section having one end thereof disposed in a plane perpendicular to the axis of the section and the other end in a plane oblique to the axis of the section with the ends having complementary mutually engageable portions adapted to fit together to hold the sections against lateral displacement when they are assembled.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of a portion of an indefinite length of pipe made up of assembled pipe sections embodying the present invention;

Fig. 2 is a view in side elevation of a pair of pipe sections embodying the present invention illustrating them as slightly separated and illustrating one section as having been rotated through approximately 180 degrees from the position illustrated in Fig. 1; and Figs. 3 and 4 are views taken substantially upon the lines 3—3 and 4—4, respectively, on Fig. 2.

Referring to the accompanying drawings wherein similar reference characters designate similar parts throughout, a pipe made up in accordance with the present invention is assembled together from pairs of sections, one pair of sections being composed of pipe section 10 and pipe section 11. The pipe section 10 has one end thereof indicated at 12 disposed in a plane perpendicular to the longitudinal axis of the section and in the end surface there is formed an annular or circular recess indicated at 13 adapted to accommodate a bead 14 of an adjoining pipe section 11a that is a duplicate of the section 11. The other end of the pipe section 10 indicated at 15 is disposed in a plane that is oblique to the axis of the pipe. This end face in plan as viewed in Fig. 3 would normally be in the form of an annular ellipse. A bead 16 which is formed therein, however, instead of being elliptical in form, is made truly circular as indicated on Fig. 3, so as to be an exact duplicate or counterpart of the bead 14. The section 11 likewise has one end indicated at 17 disposed in a plane perpendicular to the axis of the section and has a circular bead 18 formed thereon which is receivable in an annular groove 19 in the adjoining section 10a which is a duplicate of the section 10. The other end of section 11 indicated at 20 is in a plane oblique to the axis of the section and has formed therein an annular groove 21 which is circular and not elliptical in form and which is designed to receive the bead 16. Due to the fact that the bead 16 and groove 21 are circular on the oblique elliptical end faces 15 and 20, it may be necessary in the construction of the pipe to thicken the pipe walls at the top and bottom thereof as indicated at 22 and 23 to accommodate or provide space on the end faces for the complete beads and grooves. It will be noted that although the bead 16 and its groove 21 are disposed in an inclined plane with relation to the axis of the pipe, these beads and grooves are of the same size and same diameter as the beads 14 and 18 and the grooves 13 and 19.

If a straight length of pipe is desired the sections 10 and 11 may be assembled together in the manner illustrated in Fig. 1. On the other hand, if it is desired to form a turn or bend in the pipe, the pipe section 11 may be rotated 180 degrees from the position shown in Fig. 1 or into a position as illustrated in Fig. 2. When the two pipe sections are in the position illustrated in Fig. 2, they may then be brought together into assembled relationship and the maximum angle between the two sections is obtainable. If some angle between the position of zero angle in Fig. 1 and the maximum angle of Fig. 2 is desired, section 11 may be rotated any required number of degrees to produce the desired angular relationship between the two sections 10 and 11. Inasmuch as the bead 16 and the groove 21 are circular, these end formations on the oblique ends which hold the sections against lateral displacement or disalignment, permit of any desired rotational adjustment. In the course of such rotational adjustment the acute corners indicated at 24 and 25 on the sections may protrude slightly above the exterior surface of the adjoining section. However, as pipe of this character is frequently used either as irrigation pipe or sewer pipe and is embedded in the ground, the fact that there may be slight inequalities in the exterior surfaces of the sections at the joint is immaterial.

It is not essential, in assembling the pipe sections, that an oblique end be assembled against the oblique end of an adjoining section. Thus it is possible to assemble the perpendicular end of section 10a with the oblique end of section 10 and, conversely, it is possible to assemble the perpendicular end of section 11a with the oblique end of section 11. Various combinations and various angular relationships are obtainable by properly assembling the sections with each other which is permissible due to the fact that the end formations or the bead 16 and the groove 21 are circular instead of being elliptical on their respective elliptical end faces.

It will, of course, be appreciated that any suitable grout or other sealing material may be incorporated in the joint in the course of assembling and although male beads and female grooves have been illustrated as being typical mutually engageable end formations, the invention is in no way restricted thereto. Any form of complementary end formation may be employed on the perpendicular and oblique end faces of the sections, it being merely important that the end formations on the oblique ends be circular to permit of rotation of one section relatively to the other throughout 180 degrees. It is also highly desirable that the end formations on the oblique ends be complementary to the end formations on the perpendicular ends so that interchangeability is possible.

Various changes may be made in the details of construction without departing from the spirit and scope of the invention as defined by the appended claims.

I claim:

1. A pipe section having one end arranged in a plane oblique to the longitudinal axis of the section and the other end in a plane perpendicular thereto, and complementary circular mutually interfitting formations on both ends of the section adapted to mutually engage with corresponding formations on adjoining pipe sections, said formations alone holding adjoining sections against lateral displacement.

2. A pipe made up of sections having mutually engageable male and female end formations, some of said end formations being on end faces perpendicular to the axes of their respective sections and others being on end faces which are oblique thereto but all of the male and female end formations respectively being interchangeable.

3. A pipe made up of sections having mutually engageable male and female end formations, some of said end formations being on end faces perpendicular to the axes of their respective sections and others being on end faces which are oblique thereto but all of the male and female end formations respectively being circular and interchangeable.

JOHN L. MERRIAM.

REFERENCES CITED

The following references are of record in the file of this patent:

UNITED STATES PATENTS

| Number | Name | Date |
|---|---|---|
| 825,589 | Dixon | July 10, 1906 |
| 1,125,642 | Blanchard | Jan. 19, 1915 |
| 1,880,098 | Mair | Sept. 27, 1932 |

FOREIGN PATENTS

| Number | Country | Date |
|---|---|---|
| 115,118 | Australia | June 10, 1941 |